United States Patent [19]

Nishibe

[11] Patent Number: 4,912,497
[45] Date of Patent: Mar. 27, 1990

[54] DEVICE FOR DETECTING THE FOCAL VALUE FOR THE FOCUSING OF OPTICAL APPARATUS

[75] Inventor: Takashi Nishibe, Kanagawa, Japan

[73] Assignee: Fuji Electric Co., Ltd., Kanagawa, Japan

[21] Appl. No.: 218,800

[22] Filed: Jul. 14, 1988

[30] Foreign Application Priority Data

Jul. 15, 1987 [JP] Japan .................................. 62-176121

[51] Int. Cl.4 ............................ G03B 3/00; G01J 1/36
[52] U.S. Cl. ...................................... 354/408; 250/204
[58] Field of Search ............... 354/403, 406, 407, 408; 356/1, 4; 250/201, 201 AF, 201 PF, 204

[56] References Cited

U.S. PATENT DOCUMENTS

| | | | |
|---|---|---|---|
| 3,846,628 | 11/1974 | Towne | 250/204 X |
| 4,189,232 | 2/1980 | Asano et al. | 354/408 X |
| 4,640,613 | 2/1987 | Yokoyama et al. | 354/408 X |
| 4,647,174 | 3/1987 | Tsunekawa et al. | 354/408 X |
| 4,652,119 | 3/1987 | Suzuki et al. | 354/407 X |
| 4,734,571 | 3/1988 | Hamada et al. | 354/406 X |
| 4,746,790 | 5/1988 | Sorimachi | 356/4 |
| 4,766,302 | 8/1988 | Ishida et al. | 354/408 X |

Primary Examiner—W. B. Perkey
Attorney, Agent, or Firm—Finnegan, Henderson, Farabow, Garrett and Dunner

[57] ABSTRACT

A device for detecting the focal deviation value for focusing an optical apparatus includes a pair of optical lenses for receiving light from the focal object, which produces a pair of images that travel along two spatially isolated optical paths. These images are detected by a pair of photoelectric transducer arrays or photodiode arrays, which produce a pair of image signals that represents the distribution of light intensity in each image. Each image signal is composed of a plurality of image signal values. These signal values are used by a correlation evaluator, which extracts pairs of partial image signals corresponding to a predetermined number of consecutive image signal values, evaluates the correlation between any pair of extracted partial image signals, detects the position of the pair of extracted partial image signals and produces a corresponding focal deviation value for focusing the optical apparatus. The number of signal values in each image signal is not more than 1.5 times the predetermined number of consecutive image signal values of each extracted partial image signal. The device will produce a focal deviation value which shows the best correlation between extracted partial image signals.

6 Claims, 3 Drawing Sheets

DEVICE FOR DETECTING THE FOCAL VALUE FOR THE FOCUSING OF OPTICAL APPARATUS

BACKGROUND OF THE INVENTION

The present invention relates to a device for detecting the focal deviation value for the focusing of an optical apparatus that may be employed in automatic focusing of a camera.

There has been a growing need for incorporating automatic focusing capabilities in optical apparatus such as cameras, and in particular, video cameras. In one approach to automatic focusing, a beam of infrared light is used to detect the distance to the object and the camera is automatically adjusted to be in focus. This "active" system has long been used with commercial cameras but it suffers from such disadvantages as limited distances that can be detected and fairly large power consumption. Under these circumstances, a "passive" system is considered to hold much promise in future applications, and efforts to commercialize this system have been started. Basically, this "passive" system consists of examining the image of the object, detecting either the distance to the object on the basis of such a factor as parallax or the deviation from the proper focus position of the image, and automatically adjusting the camera to be in focus on the basis of the detected value. The present invention relates to the technique for implementing the "passive system".

- SUMMARY OF THE INVENTION

The present invention provides a device for detecting the focal deviation value for the focusing of an optical apparatus which includes: an optical means for receiving light from the object which is to be set in focus with the optical apparatus, the optical means producing a pair of images of said object with light that travels along two spatially isolated optical paths; an image detecting means which includes photoelectric transducer arrays for receiving the pair of images and which issues a pair of image signals that represent the distribution of light intensity in each image, each of the image signals being composed of a plurality of signal values; and a correlation evaluating means which extracts from each image signal varying combinations of partial image signals consisting of a predetermined number of consecutive signal values, evaluates the correlation between any two extracted partial image signals, detects the positions of the two partial image signals in the image signals where the two partial image signals show a high degree of correlation, and issues a focal deviation value for the focusing of the optical apparatus that corresponds to the position of the partial image signal. Specifically, the device of the present invention is characterized in that the number of signal values in the image signals is not more than 1.5 times as large as the number of signal values in the extracted partial image signals.

DETAILED DESCRIPTION OF THE INVENTION

The present invention relates to the technique for implementing the "passive" systems, in that it does not involve any moving element in the detecting unit and that a pair of object pictures are looked at with a pair of photosensor arrays, with the resulting pair of image signals being compared to each other so as to detect the distance to the object or any deviation from the proper focus position. The pair of images looked at with a pair of photosensor arrays are the images of the object that are formed by light having traveled along two spatially isolated optical paths. In systems where the distance to the object is detected as in the case of a camera with a lens shutter, such a pair of object iamges are created with a pair of small lenses spaced apart by a certain distance, and in systems where any deviation from the proper focus position is detected as in the case of a single-lens reflex camera, the object images are formed from light that has passed through different portions of a camera lens. The photosensor arrays on which these images are formed produce a pair of image signals, on the basis of which the focal deviation value indicative of the distance to the object or any deviation from the proper focus position is detected. The method of detection consists essentially of extracting different combinations of partial segments of each image signal and finding out the combination of two extracted segments that correlate in the best way. This method is described hereinafter with reference to accompanying drawings FIGS. 1 and 2.

Figure 1:
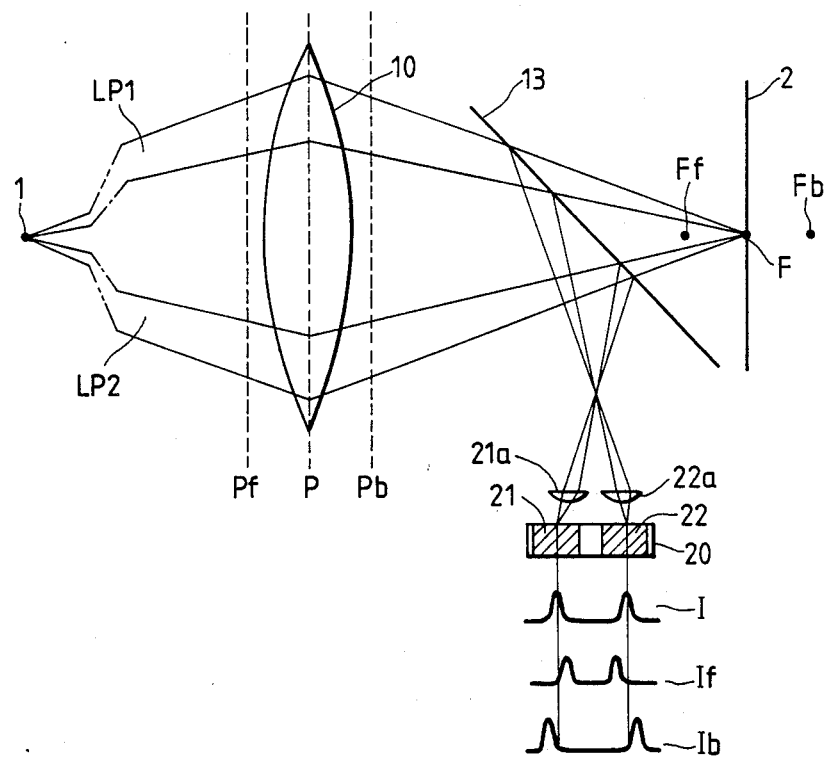
FIG. 1 shows diagrammatically an optical system in a device for detecting the focal deviation value for the focusing of an optical apparatus, to which the present invention is to be applied and which is used to obtain a focal deviation value indicative of a deviation from the proper focus position.

FIG. 1 refers to an automatic focusing system for use with a single-lens reflex camera, to which the present invention is to be applied. Assume now that the image of the subject (or object) 1 is formed through a camera lens 10 on a film surface 2 that coincides with the focal plane F. A mirror 13 is disposed between the lens 10 and the film surface 2. Light passing through the lens 10 is deflected downward by the mirror 13 as shown in FIG. 1 and is passed through a pair of small lenses 21a and 22a to form a pair of images I on a photosensor array 20 disposed behind these lenses. The luminance profiles of the respective images I are shown in FIG. 1 under the photosensor array 20. As is clear from FIG. 1, the two images I are created from the rays of light that travel on optical paths LP1 and LP2 after passing through the upper and lower portions, respectively, of the lens 10, with LP1 and LP2 being spatially isolated from each other as already mentioned. The photosensor array 20 is typically made up of CCDs and the individual photoelectric transducer arrays 21 and 22 receive the images that are produced from the small lenses 21a and 22a, respectively.

If the lens 10 is at the correct position P, the focal plane F is in coincidence with the film surface 2. However, if the lens 10 is at a forward position Pf or a backward position Pb, the corresponding focal plane will shift to either Ff in front of the film surface 2 or Fb at the back thereof. Such a deviation of the focal plane from the film surface 2 can be detected by checking the decrease or the increase of the distance between two images I on the photosensor array 20 as indicated by If or Ib. Therefore, by knowing the amount and direction of the deviation of image signal If (in front focus) or Ib (in rear focus) from the image signal I in proper focus, one will be able to determine in which direction the lens 10 should be moved and by what amount.

Figure 2:
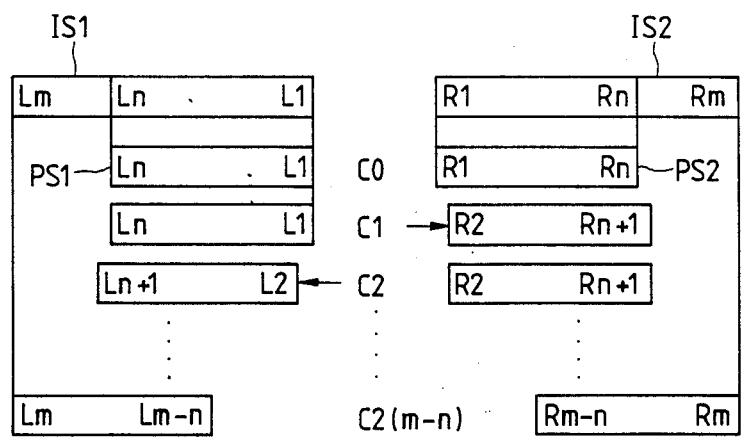
FIG. 2 is a schematic representation of image signals and partial image signals that is intended to illustrate the operation of detecting the focal deviation value using the device illustrated with FIG. 1.

FIG. 2 shows a means for detecting such a deviation, with image signals IS1 and IS2 produced from the left and right photoelectric transducer arrays 21 and 22 of the photosensor array 20. Each of the arrays 21 and 22 includes photoelectric transducers that are m in number. Therefore, as shown, the image signal IS1 on the left-hand side consists of m signal values L1 to Lm, and the image signal IS2 on the right-hand side also consists of m signal values R1 to Rm. These signal values may be in analog form as direct outputs from the photoelectric transducer arrays, or they may be A/D converted into digital form.

Suppose now combinations of partial image signals PS1 and PS2 each consisting of n signal values that are consecutively extracted from the m signal values in the image signals IS1 and IS2, in order to detect the deviation from proper focus position by comparison between IS1 and IS2. The first combination C0 shown in FIG. 2 refers to the combination of partial image signals obtained by extracting the first n signal values from image signals IS1 and IS2. As shown, the left partial image signal consists of signal values L1 to Ln, and the right partial image signal consists of signal values R1 to Rn. As a measure of the correlation between the right and left partial image signals in the combination C0, the following correlation function (1) is calculated:

$$F(O) = \Sigma |L_i - R_{n+1-i}| \quad (1)$$

where i (=1 to n) signifies the number assigned to each of the signal values in respective partial image signals as counted from their right sides. In the above equation, summation is to be performed from i=1 to i=n. As is clear from this equation, the correlation function F(0) is calculated by summing up the absolute values of the differences between corresponding two signal values (for example L1 and Rn) in the left and right partial image signals. If the contents of the two partial image signals, namely, their signal values L1 to Ln and Rn to R1, are completely identical with each other respectively, the sum of the absolute values of the differences between corresponding two signal values in these left and right partial image signals is zero. Therefore, if the correlation function F(0) assumes the value zero, the right and left partial image signals are completely identical to each other or they have the highest degree of correlation.

In the next place, the right partial image signal is shifted rightward by one signal value, with the left partial image signal remaining in the same position. As for the resulting combination C1 of the right and left partial image signals, a correlation function F(1) is calculated by the following equation (2):

$$F(1) = \Sigma |L_i - R_{n+2-i}| \quad (2)$$

The contents (L1 to Ln) of the signal values in the left partial image signal in the combination C1 are the same as in the case of the combination C0 (L1 to Ln) but those of the signal values in the right partial image signal are changed to R(n+1) to R2, as shown in FIG. 2. In a like manner, the contents of the signal values in the right and left partial image signals are alternately shifted and the kth evaluation function F(k) is calculated by the following equation (3):

$$F(k) = \Sigma |L_{i+p} - R_{n+q+1-i}| \quad (3)$$

where k=p+q and p=q or p+1=q. Calculation of consecutive correlation functions is continued until the contents of the right and left partial image signals have changed to the last n signal values in the respective partial image signals as shown on the bottom of FIG. 2. When the calculation of consecutive correlation functions is completed, the value of k is 2(m−n), and this means that the number of correlation functions F(k) obtained through the above procedure is 2(m−n)+1 where k=0 to 2(m−n).

After obtaining a number of correlation functions F(k) by the procedures described above, the function having the smallest value is selected and $k_m$ is assigned to the correlation value of $k_m$ in this function. As already mentioned, the value of the correlation function is zero if all of the n signal values in the right and left partial image signals are identical. In practice, however, the correlation function rarely assumes the value of zero and it is necessary to select the function having the smallest value. The combination corresponding to $k=k_m$ will refer to the case where the right and left partial image signals, or the images of the subject received by the photoelectric transducer arrays 21 and 22, correlate in the best way of all the combinations checked. The value of $k_m$ represents the sum of the number of photoelectric transducers by which images have been alternately shifted on the photoelectric transducers in order to attain the best correlation. The position at which two pictures I are produced when the lens 10 is in focus is inherently determined by the geometric layout of the photosensor array 20, so that the value of $k_m$ producing the best correlation when the lens 10 is in focus is also determined inherently. With this predetermined value of $k_m$ written as $k_o$, the focal deviation value EV is determined by the following equation (4):

$$EV = k_m - k_o \quad (4)$$

As will be understood from the foregoing description, EV represents, in terms of the number of photoelectric transducers, the amount by which If (the images in front focus) or Ib (the images in rear focus) deviates from the proper focus of images I. The positive sign of EV indicates that the images are in rear focus and the negative sign of EV indicates that they are in front focus. The magnitude of the absolute value of EV indicates the amount by which the lens 10 has to be moved in order to attain proper focus. Therefore, if one knows EV, he is able to bring the camera into proper focus by moving the lens 10 in either direction in accordance with the sign of EV by an amount corresponding to the value of EV.

The correlation function $F(k)$, the value of $k_m$ corresponding to the best correlation and the value of EV, which have been described above with reference to FIG. 2, are calculated with a microprocessor or IC circuits that are incorporated in an optical apparatus of interest for receiving image signals from the photosensor array 20. If a microprocessor is used, a plurality of correlation functions are of course calculated serially. On the other hand, if IC circuits are used, a plurality of correlation functions can be calculated in parallel, thereby enabling EV to be obtained in a very short period of time.

In the device for detecting the focal deviation value for the focusing of an optical apparatus that is described on the foregoing pages, the precision of detection is increased by decreasing the distance between neighboring photoelectric transducers in a photosensor array or by increasing the number of such transducers, and the resulting focal deviation which indicates any deviation from the proper focus positions is used to accomplish fine adjustment of the focusing of the optical apparatus. With the present technology, a great number of photoelectric transducers spaced by a distance of a few microns can be incorporated into a small photosensor array and this enables the lens in a single-lens reflex camera to be automatically adjusted to be set at one of 100 or more focus positions. It is also possible for the focal deviation value to be detected within a very short period of time from the image signals produced from the photosensor array.

However, the present inventor has carried out research with in the device and has found a problem with the above-described device for detecting the focal deviation value for the focusing of an optical apparatus. The problem is that some optical patterns of the object to be set in focus with the optical apparatus or some optical conditions of the background around the object cause the focual deviation value to be erroneous or to become impossible to be appropriately determined. The problem is described in detail hereinafter with reference to FIGS. 3 and 4.

Figure 3:
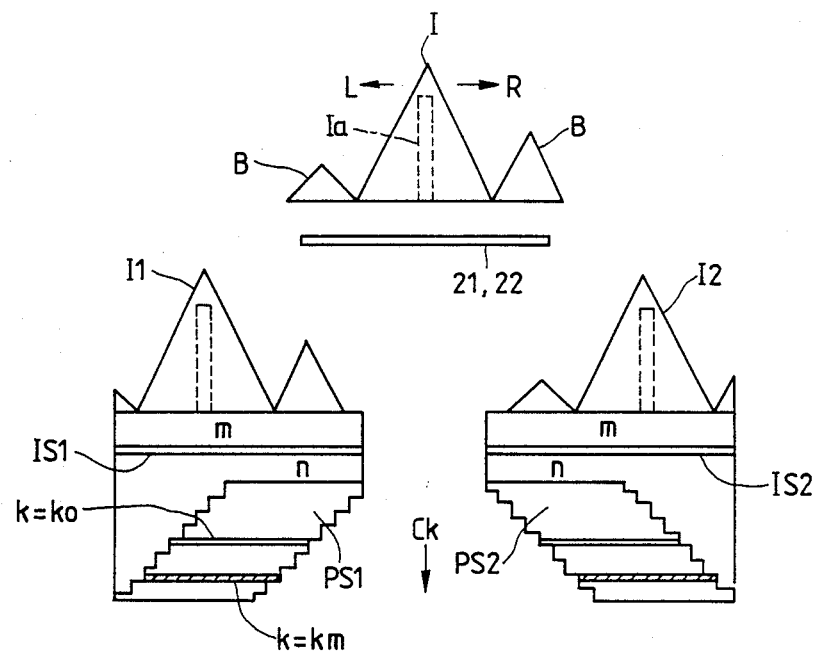
FIG. 3 is a similar represenatation that illustrates the operation of the device together with the image of the object and its background.

The center top of FIG. 3 to shows the image I of the object produced on the photoelectric transducer arrays 21 and 22 of the photosensor array 20, as well as the image of the background B around the object. These images are shown to overlap each other on the transducer arrays 21 and 22 on the assumption that the optical apparatus is in proper focus. If the optical apparatus is not in proper focus and is in rear focus, the images to be produced on the left transducer array 21 will be shifted leftward as indicated by an arrow L, whereas the images to be produced on the right transducer array 22 will be shifted rightward as indicated by an arrow R. In the lower part of FIG. 3, the shifted images I1 and I2 are shown with respect to the left and right image signals IS1 and IS2. Each of the image signals IS1 and IS2 consists of m signal values that represent the light intensity distribution of the respective images I1 and I2. Below IS1 and IS2, the contours of extracted partial image signals PS1 and PS2 corresponding to their various combinations Ck described above are shown schematically.

Figure 4:
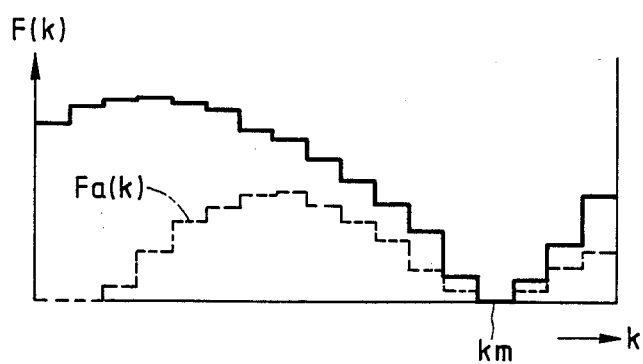
FIG. 4 is a graphic representation of the profiles of two typical evaluation functions obtained from the device.

In FIG. 4, correlation functions $F(k)$ corresponding to various values of k are shown by the solid line. As mentioned already, the correlation function $F(k)$ assumes the smallest value or exhibits the best correlation, at $k=k_m$. If the pattern of the object and the background are as shown in FIG. 3, the profile of the correlation function $F(k)$ is fairly simple as will be understood from FIG. 4 and the value of $k_m$ referring to the best correlation can be determined easily and uniquely, thereby allowing the focal deviation value to be determined from the difference between $k_m$ and $k_o$ which corresponds to the case where the lens 10 is in proper focus. However, if the pattern of the object is very simple and if there is no background around it as shown in FIG. 3 by the dashed line, a correlation function $Fa(k)$ indicated by the dashed line in FIG. 4 will be obtained. The function $Fa(k)$ assumes the smallest value at $k=k_m$, as does the correlation function $F(k)$. However, this function $Fa(k)$ could also assume the smallest value or a very small value at other values of k. If the correlation function shows the smallest value for more than one combination of partial image signals, it becomes impossible to determine the combination of partial image signals that refers to the best correlation of images (i.e., it is impossible to determine which value of k should be taken) or a wrong value of k might be determined. Such a problem is also liable to occur in other cases that are not as extreme as described above and in which the pattern of the object which is to be set in focus with the optical apparatus is fairly simple and the background is blurry as compared to the images and has a substantially constant distribution of light intensity. In these situations, the correct focal deviation value could not be determined or an erroneous deviation value of could be detected.

In order to solve the problem, the present inventor has further carried out research on into the device, and provides a device for detecting the focal deviation value of for the focusing of an optical apparatus which includes: an optical means for receiving light from the object which is to be set in focus with the optical apparatus, the optical means producing a pair of images of the object with light that travels along two spatially isolated optical paths; an image detecting means which includes photoelectric transducer arrays for receiving the pair of images and issues a pair of image signals that represent the distribution of light intensity in each image, each image signal being composed of a plurality of signal values; and a correlation evaluating means which extracts from each image signal varying combinations of partial image signals consisting of a predetermined number of consecutive signal values, evaluates the correlation between any two extracted partial image signals, detects the positions of the two partial image signals in the image signals where the two partial image signals show a high degree of correlation, and issues a focal deviation value for the focusing of the optical apparatus that corresponds to the position of the partial image signal. Specifically, the device of the present invention is characterized in that the number of signal values in the image signals is not more than 1.5 times as large as the number of signal values in the extracted partial image signals.

We will describe hereinafter how the problems can be solved in the present invention. The efforts to solve the already-mentioned problems are quite complicated, since the problem occur not only by the pattern of the object which is to be set in focus as the subject but also by the distribution of the light intensity of the background of the object. With a view to simplifying the approach to these problems, the present inventor started the research with the worst case where the distribution of the light intensity of the background is completely uniform. As described already, correlation functions are calculated for various combinations of partial image signals, but in the presence of a combination of partial image signals that represent only the background of the object, the correlation function for that combination will assume the smallest value. While the background image in fact has some variation in its light intensity distribution even when unsharply focused, the correlation function is still most likely to assume a fairly small value for the combination of partial image signals representing only the background. On the other hand, if a signal value indicative of the object is contained in either one of the two partial image signals to be combined, the correlation function for that combination will assume a fairly large value except for the combination to be detected in which all signal values of the right and left partial image signals coincide, and there will be no possibility at all that the smallest value is confused with other smallest values of the correlation function at issue or any small value that is assumed by that function.

Therefore, in accordance with the present invention, the already-described problems are solved by ensuring that no two partial image signals both of which represent only the background of the object are combined for calculation of correlation functions. The possibility that partial image signals representing only the background of the object are extracted from both the right and left image signals is increased in proportion as the number of signal values contained in the image signals increases and as the number of signal values contained in the partial image signals decreases. Therefore, in accordance with the present invention, the ratio of the number of signal values in the image signals to the number of signals values in the extracted partial image signals is set to be less than a predetermined value. For the purposes of the present invention, 1.5 is selected as this predetermined value and the reason for selecting this value requires a somewhat long explanation and will be discussed later with the description of the preferred embodiment of the present invention. Stated in a more exact way, the ratio of the number of signal values in the image signals to the number of signal values in partial image signals needs to be not more than 1.5 where the partial image signal contains an even number of signal values, and the ratio needs to be less than 1.5 where the partial image signal contains an odd number of signal values.

By ensuring that the ratio of the number of signal values in an image signal to the number of signal values in a partial image signal is smaller than a predetermined critical value, the possibility that two partial image signals represent only the background of the object, when extracted simultaneously from image signals and combined together for calculation of a correlation function is eliminated. As a result, the calculated to correlation function will in no case contain an unwanted smallest value or some other erroneously small value, thereby enabling the desired focal deviation value to be uniquely determined.

Figure 5:
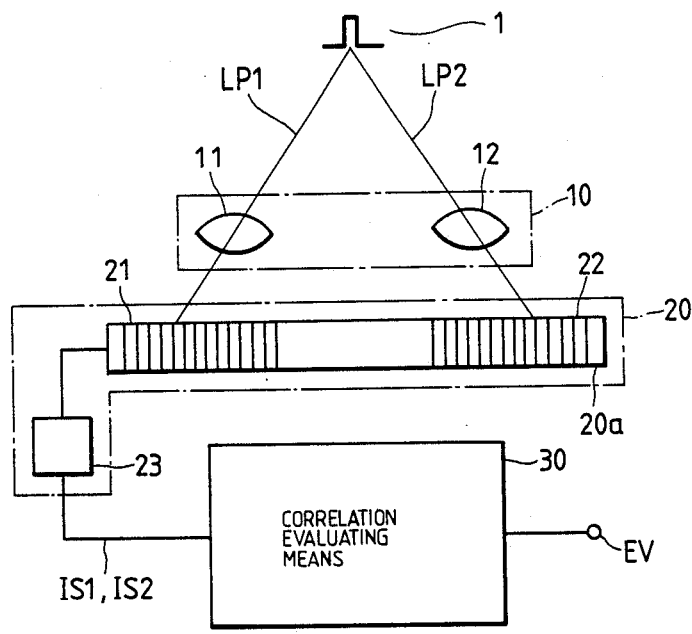
FIG. 5 shows diagrammatically an embodiment of the present invention in which the device of the present invention for detecting the focal deviation value for the focusing of an optical apparatus is applied for the purpose of obtaining a focal deviation value evaluation indicative of the distance to the object.

An embodiment of the present invention is described hereinafter with reference to FIGS. 5 and 6. FIG. 5 shows schematically an embodiment of the present invention in which the device of the present invention is used for detecting an index of the distance to the object as a focal value duration for the focusing of an optical apparatus such as a camera with a lens shutter.

As shown in FIG. 5, light radiated or reflected from the object travels on two spatially isolated optical paths LP1 and LP2 and is guided through a pair of small lenses 11 and 12 that make up an optical means 10. These small lenses 11 and 12 form the images of the object 1 on photoelectric transducer arrays 21 and 22 in a photosensor array 20a serving as an image detecting means 20. For the purposes of the following discussion, it is assumed that the object 1 has a simple pattern as shown and that it has no background at all in the worst case already described. As shown, the two small lenses 11 and 12 are spaced apart by a certain fixed distance in such a way that when the object 1 is at infinity, the images thereof are formed on the photoelectric transducer arrays 21 and 22 just in front of these lenses 11 and 12. If, as shown in FIG. 5, the object 1 comes close to the optical apparatus incorporating the optical means 10, the images on the left and right transducer arrays 21 and 22 will be shifted leftward and rightward, respectively, from the position which is just in front of these lenses. Therefore, by detecting the deviations of the images from the front position of the small lenses 11 and 12 with respect to the photoelectric transducer arrays 21 and 22 and by summing up these deviations, a focal deviation value EV can be obtained which is used as an index of the distance of the object 1 from the optical means 10 (i.e., subject distance). As is well known in the art of the triangulation technique, the focal deviation value EV is the reciprocal of the subject distance and for the purpose of focusing the optical apparatus, it would be convenient to use EV, rather than the subject distance, in adjusting the taking lens.

The distribution of the light intensity of the images thus formed on the photoelectric transducer arrays 21 and 22 in the image detecting means 20 is represented by image signals IS1 and IS2 which are supplied from the photosensor array 20a, typically made of CCDs. These image signals are fed into an A/D converter 23, where their analog signal values are converted into digital form and thence supplied to the correlation evaluating means 30 which typically includes a microprocessor. In the embodiment shown, the image detecting means 20 consists of a single photosensor array 20a in the form of CCD. Instead, two photodiode arrays may be used as the photoelectric transducer arrays 21 and 22. In this alternative case, the A/D converter 23 needs to be provided for each of the transducer arrays 21 and 22. As mentioned already, IC circuits rather than a microprocessor may be used as the correlation evaluating means 30 in order to shorten the time required for EV detection.

Figure 6:
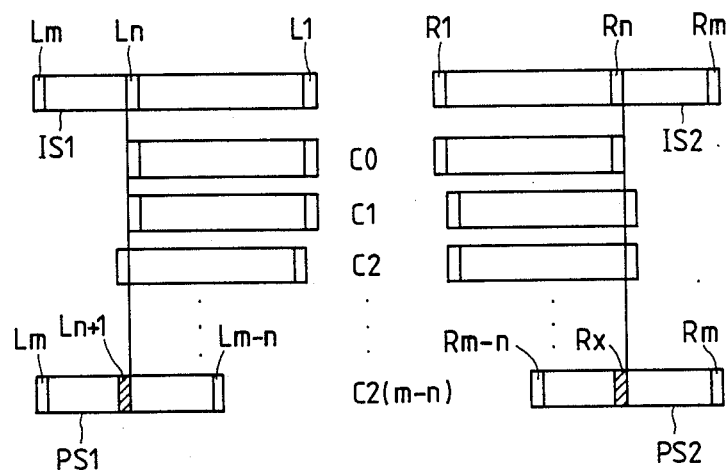
FIG. 6 is a schematic representation of image signals and partial image signals that is intended to illustrate the operation of detecting the focal deviation value using the correlation evaluating means of the device of the present invention.

FIG. 6 shows schematically the procedures for calculating correlation functions with the correlation evaluating means 30. The method of calculation is basically the same as already described with reference to FIG. 2, except that the ratio of m to n (m is the number of signal values contained in the left and right image signals IS1 and IS2, and n is the number of signal values contained in the partial image signals PS1 and PS2 extracted from image signals IS1 and IS2) is limited to be not more than 1.5. Therefore, it will not be necessary to explain the procedures of calculating correlation function F(k) for the combinations Ck corresponding to k=0 to 2(m−n) and the following description is directed to discussing the reason for limiting m/n to be smaller than 1.5.

The already-described problems will occur in the case where only signal value representing the background of the object are contained in every the left and right partial image signal PS1 and PS2, which are extracted from the respective image signals IS1 and IS2, with respect to specific combinations Ck as shown in FIG. 6 for the purpose of calculating the correlation function F(k). The problems can be solved if a non-background and meaningful or significant signal value, or a signal value representing the object 1, is contained in either one of the left and right partial image signals PS1 and PS2 for any of the combinations Ck. If this condition is met, the evaluation function F(k) will not assume the undesired smallest value or some other erroneous small value.

In order to find the condition necessary for solving the problems at issue, let us consider the case of the left image signal IS1 shown in FIG. 6. This left image signal IS1 contains m signal values L to Lm. If the first n signal values L1 to Ln include at least one meaningful signal value which represents the object 1, such a meaningful or signficant signal value will always be contained in the left partial image signal PS1 for all of the combinations Ck, which are 2(m−n)+1 in total number, and no problem of the nature already described will occur. Therefore, it is first assumed that each of the first n signal values L1 to Ln in the image signal IS1 will represent the background of the object. In other words, a significant or meaningful signal value which represents the object will always be present in the remaining (m−n) signal values Ln+1 to Lm in the image signal IS1. The smaller the number of such meaningful signal values, the more likely the problem will occur. Therefore, in order to consider the worst case, let us assume that the object 1 has a very simple pattern as shown in FIG. 5 and that only one of the remaining signal values Ln+1 to Lm in the image signal IS1 is meaningful.

Let us then consider the position at which such a meaningful signal value is located. As one can see from the partial image signal PS2 shown on the right-hand side of FIG. 6, the more leftward a singled significant or meaningful signal value is situated among the remaining signal values Ln+1 to Lm in the left partial image signals PS1, the greater the chance of a significant signal value of being contained in the right partial image signal PS2 for all combinations Ck, thereby rendering the problem less likely to occur. To consider the worst case, the signal value Ln+1, that is hatched and situated at the right end of the row of the remaining signal values Ln+1 to Lm, is assumed to be the above-described meaningful signal value.

A significant signal value corresponding to this single significant or meaningful signal value Ln+1 is always contained in the right picture signal IS2. For the purposes of the following discussion, this significant signal value corresponding to Ln+1 is written as Rx. The problem under consideration can be solved if Rx is always present in the right partial image signal PS2 for all combinations Ck. Since the layout of signal values in the same for both partial image signals PS1 and PS2, the combination of partial image signals which is least likely to contain Rx in the right partial image signal PS2 is C2(m−n) that is shown at the bottom of FIG. 6. The problem can be solved if Rx is contained in the right partial image signal PS2 for this particular combination C2(m−n). Needless to say, the number of signal values in each of the left and right partial image signals PS1 and PS2 for this final combination is n and the sequence of these signal values is also the same for both partial image signals. Since the leftmost signal value in the right partial image signal PS2 is Rm-n, the value of subscript x in Rx in the right partial image signal PS2, corresponding to the single significant or meaningful signal value Ln+1 in the left partial image signal PS1, is determined by the following equation (5):

$$x=(m-n)+m-(n+1)=2m-2n-1 \quad (5)$$

The right partial signal PS2 that is least likely to contain Rx is the one that corresponds to the combination C0. Since the signal value of this partial image signal at its rightmost end is Rn, Rx is contained in all pieces of the right partial image signal PS2, if $x \leq n$. Therefore, the condition for solution to the problem under consideration is expressed by the equations (6) and (7):

$$2m-2n-1 \leq n \quad (6)$$

$$\therefore m \leq 1.5n+0.5 \quad (7)$$

This expression would be rather difficult to understand since it contains 0.5 on the right side. To put it in a straightforward way, $m \leq 1.5n$ is the condition to be satisfied if n is an even number, and $m < 1.5n$ should be satisfied if n is an odd number.

The foregoing description concerns the process for determining the condition in which a significant or meaningful signal value is always present in the right partial image signal PS2 for the first combination C0 of right and left partial image signals, even if a meaningful signal is not contained in the left partial image signal PS1. As will be readily understood, the same conclusion will hold true even if the left and right partial image signals PS1 and PS2 are changed in position. In certain cases, the reference significant signal value is situated in the left or right image signal IS1 or IS2 at a position other than Ln+1 or Rn+1 or a plurality of such significant signal values are contained in either image signal. One will readily understand that even in such cases, the problem at issue can always readily be solved by satisfying the condition set forth above.

To give an example of the numerical figures that satisfy this condition, n=128 and m=192. Since the number of possible combinations of the partial image signals is 2(m−n)+1=129, fine adjustment for allowing the optical apparatus to be set at one of 129 focus positions can be accomplished by incorporating 192 photoelectric transducers in each of the transducer arrays 21 and 22 of the image detecting means 20. If, as shown in FIG. 5, the photosensor array 20a in the image detecting means is made of CCDs, the number of transducers in each of the arrays 21 and 22 can be set to a value greater than 192. However, in practical applications of the present invention, the number of these transducers may be limited to be not more than 192, with the left and right image signals IS1 and IS2 being picked up as outputs from the photosensor array. In the embodiment shown in FIG. 5, the device of the present invention is used to obtain a focal deviation value EV indicative of the subject distance and hence is suitable for application to a camera with a lens shutter. It should, of course, be understood that the concept of the present invention is also applicable to the purpose of obtaining EV that is indicative of any deviation or phase difference from the state in focus, as already described with reference to FIG. 1. This embodiment is suitable for application to a single-lens reflex camera.

As described on the foregoing pages, the present invention generally relates to a device for detecting the focal deviation value for the focusing of an optical apparatus which includes: an optical means for receiving light from the object which is to be set in focus with the optical apparatus, the optical means producing a pair of images of said object with light that travels along two spatially isolated optical paths; an image detecting means which includes photoelectric transducer arrays for receiving the pair of images and issues a pair of image signals that represent the distribution of light intensity in each image, each image signal comprising a plurality of signal values; and a correlation evaluating means which extracts from each image signal varying combinations of partial image signals consisting of a predetermined number of consecutive signal values, evaluates the correlation between any two extracted partial image signals, detects the position of the two partial image signals in the image signals where the two partial image signals show a high degree of correlation and issues a focal deviation value of for the focusing of the optical apparatus that corresponds to the position of the partial image signal. Specifically, the device is characterized in that the number of signal values in the image signals from which the is not more than 1.5 times as large as the number of signal values contained in the extracted partial image signals. Because of this feature, for all combinations of partial image signal pairs on which correlation functions are to be calculated using the correlation evaluating means, there is no possibility that a correlation function is calculated from a pair of partial image signals that contain only insignificant or meaningless signal values which represent the background of the object. Instead, all evaluation functions will be calculated from a pair of partial image signals, at least one of which alway contains a significant or meaningful signal value which represents the object. Therefore, in all cases of its operation, the device of the present invention will produce a correlation function that assumes the intended smallest value or which shows the best correlation between partial image signals, and no correlation function that erroneously shows the best correlation will be produced. As a result, an evaluation function that shows the best correlation can be uniquely determined and the correct focal deviation value that indicates the subject distance or any deviation from the state in proper focus can be obtained consistently from the so determined correlation function.

In practicing the present invention, there is no need to add any part to the device illustrated by FIG. 1 for detecting the focal deviation value for the focusing of an optical apparatus, and the intended advantage can be attained without any extra cost, thereby improving the performance or reliability of the automatic focusing unit in optical apparatus such as a camera with a lens shutter or a single-lens reflex camera.

What is claimed is:

1. A device for detecting the focal deviation value for the focusing of an optical apparatus comprising:
   an optical means for receiving light from an object, and for producing a pair of images along two spatially-isolated optical paths;
   an image detecting means for receiving said pair of images and for producing a corresponding pair of image signals representing the distribution of light intensity in each image, each image signal including a plurality of image signal values; and
   a correlation evaluating means for extracting from each image signal a predetermined number of consecutive image signal values to form varying combinational pairs of extracted partial image signals, for evaluating the correlation between any pair of extracted partial image signals, for detecting the position at which the pair of extracted partial image signals shows a high degree of correlation, and for issuing a focal deviation value for the focusing of the optical apparatus that corresponds to the detected positions of the pair of extracted partial image signals, said plurality of image signal values of each image signal being not more than 1.5 times the predetermined number of consecutive image signal values of each extracted partial image signal.

2. A device for detecting the focal deviation value as recited in claim 1, wherein said plurality of image signal values of each image signal is less than 1.5 times the predetermined number of consecutive image signal values of each extracted partial image signal, given an odd number of image signal values in each extracted partial image signal.

3. A device for detecting the focal deviation value as recited in claim 1, wherein said image detecting means comprises at least one photoelectric transducer array.

4. A device for detecting the focal deviation value as recited in claim 1, wherein said image detecting means comprises at least one photodiode array.

5. A method for detecting the focal deviation value for the focusing of an optical apparatus comprising the steps of:
   receiving light from an object and producing a pair of images from said light along two spatially isolated optical paths;
   producing a pair of image signals corresponding to said images, wherein said image signals represent the distribution of light intensity in each image, and further wherein each image signal includes a plurality of image signal values;
   extracting a predetermined number of consecutive image signal values from each image signal to form varying combinational pairs of extracted partial image signals, wherein said plurality of image signal values of each image signal is not more than 1.5 times the predetermined number of consecutive image signal values of each extracted partial image signal;
   detecting the positions at which the pair of partial image signals shows a high degree of correlation; and
   issuing a focal deviation value for the focusing of the optical apparatus that corresponds to the detected position of the pair of extracted partial images signals.

6. A method for detecting the focal deviation value as recited in claim 5, wherein said plurality of image signal values of each image signal is less than 1.5 times the predetermined number of consecutive image signal values of each extracted partial image signal, given an odd number of image signal values in each extracted partial image signal.

* * * * *